United States Patent [19]

Cain et al.

[11] 4,443,044
[45] Apr. 17, 1984

[54] BEARING MOUNT AND METHOD OF MOUNTING A BEARING THEREIN

[75] Inventors: Earl S. Cain, Portola Valley; Jerome A. Carlson, Woodside; William L. Barger, Redwood City, all of Calif.

[73] Assignee: Tribotech, Redwood City, Calif.

[21] Appl. No.: 139,251

[22] Filed: Apr. 11, 1980

[51] Int. Cl.³ .................... F16C 13/00; F16C 43/00
[52] U.S. Cl. ........................ 384/428; 308/189 A; 29/149.5 R; 29/505
[58] Field of Search .......... 308/15, 26, 184 R, 189 R, 308/188, 236, DIG. 11; 29/149.5, 505, 724, 725

[56] References Cited

U.S. PATENT DOCUMENTS

| | | | |
|---|---|---|---|
| 2,700,581 | 1/1955 | Migny | 308/236 |
| 3,339,991 | 9/1967 | Howe, Jr. | 308/236 |
| 3,966,275 | 6/1976 | Cain et al. | 308/15 |
| 4,033,641 | 7/1977 | Cain et al. | 308/15 |
| 4,047,768 | 9/1977 | Cain et al. | 308/15 |

FOREIGN PATENT DOCUMENTS 332613  2/1920  Fed. Rep. of Germany ...... 308/236

Primary Examiner—Willis Little
Attorney, Agent, or Firm—Flehr, Hohbach, Test, Albritton & Herbert

[57] ABSTRACT

A bearing mount in which the bearing seat has uniform structure without slots or cutouts. A bearing is snapped into the seat by distorting an unsupported end of the seat. The seat may be distorted beyond its elastic limit, and after aligning the bearing axis of rotation and the seat axis, the distorted end of the seat may grip the bearing in two point contact to prevent rotation of the bearing in the seat.

6 Claims, 9 Drawing Figures

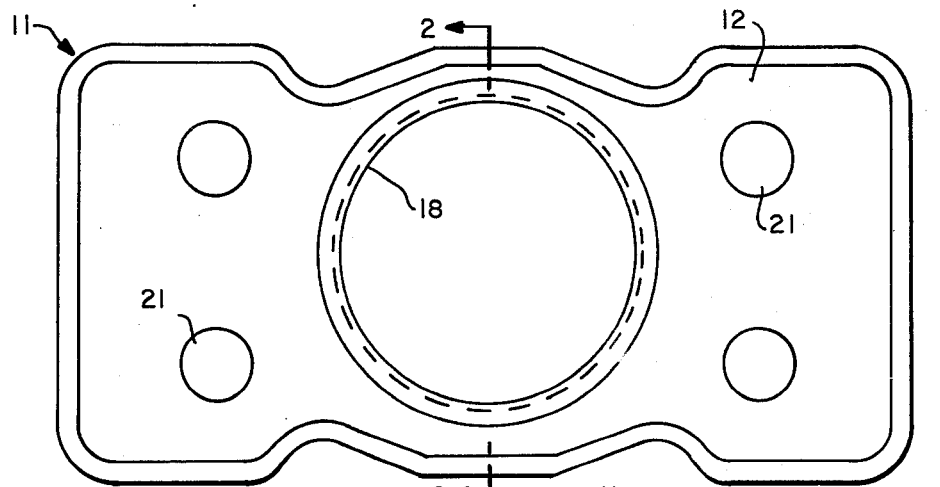
FIG.—1
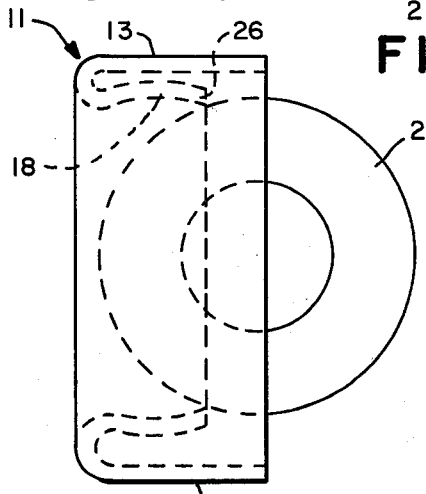
FIG.—2
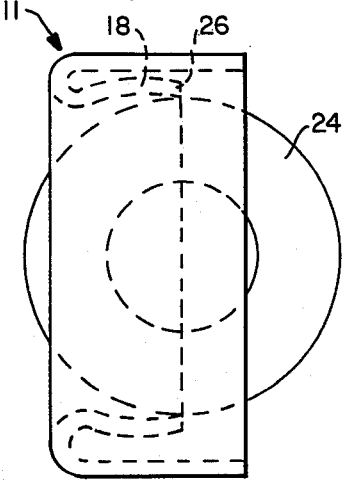
FIG.—3
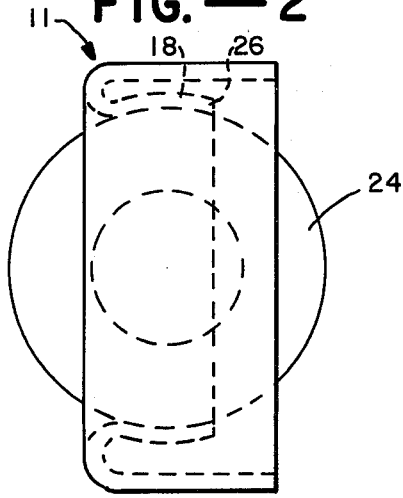
FIG.—4
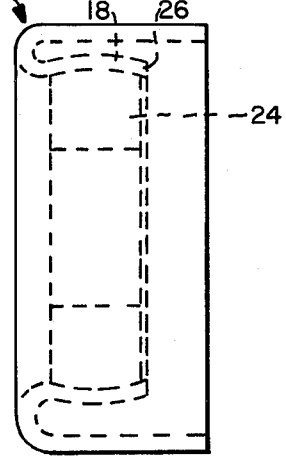
FIG.—5

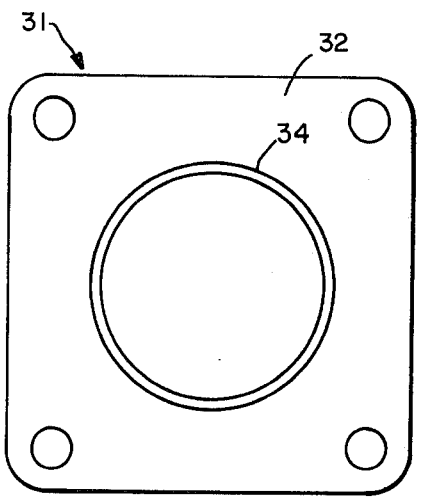
FIG.—6
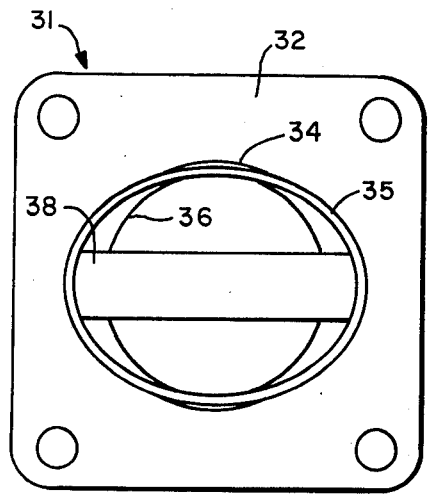
FIG.—7
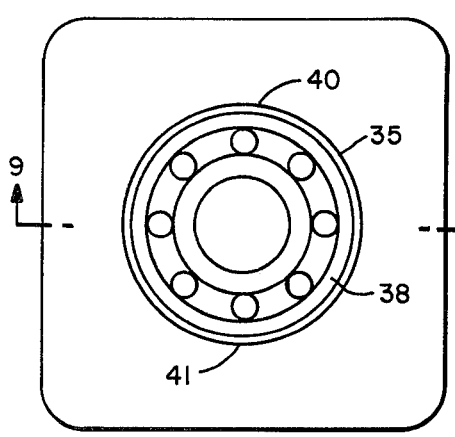
FIG.—8
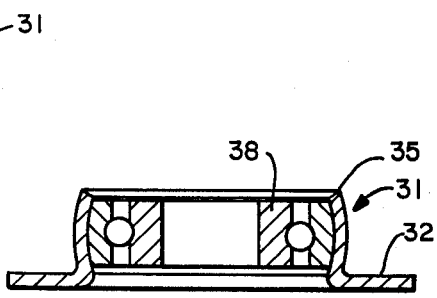
FIG.—9

BEARING MOUNT AND METHOD OF MOUNTING A BEARING THEREIN

This invention relates generally to bearing mounts and more particularly the invention relates to a bearing mount which does not require special shaping or cutout loading notch portions to receive and secure a bearing.

Bearing mounts typically include a housing having a seat for receiving and holding the bearing and means such as a flange or the like for attaching the bearing to a support surface. For example, U.S. Pat. No. 4,268,096, assigned to the present assignee, discloses a flange mount in which a bearing is mounted with the rotational axis being perpendicular to the bearing mounting surface. U.S. Pat. No. 3,966,275, also assigned to the present assignee, discloses a mount which can selectively position a bearing with the rotational axis being either perpendicular or parallel to the mounting surface.

In many bearing mounts including those disclosed in the above identified patents a slot or loading notch is formed in the seat to receive the bearing and allow rotation of the bearing within the seat, thereby facilitating alignment of the rotational axis with the seat axis. In other bearing mounts such as disclosed in U.S. Pat. No. 2,794,691 a portion of the housing seat is cut out to provide assembly slots.

U.S. Pat. No. 2,952,900 discloses a pillow block mount in which slots are not needed since the bearing is assembled piece by piece within the mount. The outer bearing race is inserted in the mount by first deforming the race and housing by vise means. The deformations are kept within the elastic limits of the housing and race material whereby the normal circular shape returns upon release of the vise pressure.

U.S. Pat. No. 3,068,551 discloses a rod end bearing in which the mounting sleeve is deformed by a vise to allow insertion of a bearing therein. Again, the deformation is within the elastic limits so that the circular shape of the sleeve returns upon release of the vise pressure.

An object of the present invention is an improved bearing mount.

Another object of the invention is a bearing mount having a uniform uninterrupted seat.

Still another object of the invention is a method of inserting a bearing in a mount without the need for special assembly fixtures.

Briefly, a bearing mount in accordance with the invention comprises a housing seat with a flange support attached to one side of the seat. The other side of the seat is unsupported. The seat preferably has a generally spherical bearing receiving surface and the unsupported side of the seat is generally uniform and uninterrupted by slots or cut-outs.

In assembling a bearing in the mount, the axis of rotation of the bearing is oriented perpendicular to the axis of the seat, and the bearing is inserted in the unsupported side of the seat. The seat is made of an elastic ductile material and at the urging of the bearing the unsupported side distorts elliptically thereby permitting the full insertion of the bearing into the seat. Thereupon, the bearing is rotated so that the bearing axis and the seat axis coincide.

The supported side of the seat remains generally round and facilitates rounding up the unsupported side of the bearing seat.

In accordance with a feature of the invention the unsupported side of the bearing seat, if it has been flexed beyond its elastic limits, exerts pressure circumferentially on the outer ring of the bearing thereby gripping the bearing and inhibiting bearing circumferential rotation within the seat.

The invention and objects and features thereof will be more fully understood from the following detailed description and appended claims when taken with the drawings, in which:

FIG. 1 is a plan view of one embodiment of a bearing mount in accordance with the invention.

FIGS. 2-5 are side views in section of the bearing mount of FIG. 1 taken along the line 2—2 and which illustrate the method of inserting a bearing in the mount in accordance with the invention.

FIG. 6 is a plan view of another embodiment of a flange bearing mount in accordance with the invention.

FIG. 7 is a plan view of the bearing mount of FIG. 6 during assembly of a bearing therein in accordance with the invention.

FIG. 8 is a plan view of the mount after assembly of a bearing therein.

FIG. 9 is a plan view in section of the mount of FIG. 8 taken along the line 9—9 and illustrates the result of inserting a bearing in the mount in accordance with the invention.

Referring now to the drawings, FIG. 1 is a plan view of one embodiment of a bearing mount in accordance with the invention and is similar to the bearing mount disclosed in U.S. Pat. No. 3,966,275. The bearing mount is a box-like structure 11 which is formed from a single sheet of material such as steel by forming and punching. The mount includes a flange plate 12 with integral spaced sides 13 and 14 and ends 16 and 17 defining the box-like structure. The flange plate 12 includes a bearing receiving seat 18 whose inner surface is substantially a surface of revolution to receive and hold an associated bearing. One end of the seat is attached to and is preferably integral with flange plate 12 and the opposite end of the seat is unsupported and has generally uniform construction without cutouts or slots formed therein.

As described in U.S. Pat. No. 3,966,275 the outer surfaces of the flange plate and the sides and ends provide mounting surfaces for engaging an associated support to position the bearing mount. The sides, ends, and flange plate may be provided with a plurality of holes 21 adapted to receive fastening means for securing the bearing mount to an associated supporting structure.

In accordance with a feature of the invention the sheet of material from which the seat 18 is formed is deformable by the insertion of a bearing therein.

Referring now to FIGS. 2-5, side views in section of the bearing of FIG. 1 illustrate the method of inserting a bearing into the mount in accordance with the invention. In FIG. 2 a bearing 24 is positioned in engagement with the unsupported end 26 of the seal 18 with the rotational axis of bearing 24 being perpendicular to the axis of the bearing mount. As shown in FIG. 3 pressure is exerted on the bearing 24 which deformably flexes the unsupported end 26 outwardly in an elliptical configuration whereby the bearing 24 may be fully inserted into the bearing mount. In so deforming the unsupported end 26 of the seat, the sheet material of the seat may be deformed beyond its elastic limit as noted by the end 26 not engaging the outer rate of bearing 24 in FIG. 4. Thereafter, bearing 24 is rotated 90° whereby the rotational axis of the bearing aligns with the axis of the seat, as illustrated in FIG. 5.

In one embodiment the mount was press formed from one-eighth inch thick steel sheet with the diameter of the opening at the unsupported end being 1.910 inches. A bearing having an outer diameter of 2.047 inches and a width of 0.600 inches was inserted therein by the application of a hand push force. During insertion the opening distorted to a maximum diameter of approximately 2.047 inches and a minimum diameter of less than 1.910 inches. After rotation of the inserted bearing the open end tended to round up to its original configuration, but sufficient plastic distortion remained whereby the bearing was gripped circumferentially on opposite sides.

FIG. 6 is a plan view of another embodiment of a bearing mount in accordance with the invention which is similar to the flange mount illustrated in U.S. Pat. No. 4,268,096. Bearing mount 31 is a unitary structure formed and punched from a single sheet of material and includes a flange plate 32 which includes a bearing receiving seat 34. Similar to the seat 18 in the mount of FIG. 1, seat 34 is integral with and supported by the flange plate 32 on one end, and the opposite end of seat 34 is unsupported and is generally uniform and uninterrupted in configuration.

A bearing is inserted in the mount of FIG. 6 in a manner similar to that illustrated in FIGS. 2-5. FIG. 7 is a plan view of the mount 31 with a bearing 38 fully inserted therein. For illustration purposes the distortion of the unsupported end 36 of seat 34 is exagggerated to show a distorted eliptical shape. However, the supported end 36 of the seat 34 remains generally circular in configuration.

FIG. 8 is a plan view of the mount 31 with bearing 38 assembled therein. The rotation of the bearing to align the axis of the bearing and the axis of the seat causes the unsupported end 25 of the seat to round up. However, in accordance with one feature of the invention the unsupported side of the seat, if flexed beyond its elastic limit, exerts two point pressure at the points 40 and 41 on the outer race of the bearing thereby gripping the bearing and preventing bearing rotation within the seat.

As illustrated in the cross section view of FIG. 9, taken along the line 9—9 in FIG. 8, after the bearing 38 is fully inserted in the mount 31 and rotated to align its axis with the seat axis, the unsupported end 35 of the seat may be distorted beyond the elastic limit but will still be in close proximity to the outer race of bearing 38.

A bearing mount in accordance with the present invention is especially useful for field maintenance of equipment since special assembly fixtures are not required. The bearing readily snaps into position by exerting sufficient force on the bearing to distort the bearing seat opening. Since the seat may be distorted beyond its elastic limit, the bearing is gripped to prevent rotation in the seat. While the invention has been described with reference to specific embodiments, the description is illustrative of the invention and is not to be construed as limiting the invention. Thus, various modifications and applications may occur to those skilled in the art without departing from the true spirit and scope of the invention as defined by the appended claims.

What is claimed is:

1. A bearing mount and bearing, said bearing mount comprising a flange portion, a bearing receiving seat of elastic ductile material extending outwardly from said flange portion with one end of said seat being supported by said flange portion and the opposite end of said seat being unsupported, a bearing positioned in said seat, said opposite end of said seat being generally uniform and uninterrupted by insertion slots and having an opening which is smaller than the outer diameter of a bearing to be mounted, said opposite end being permanently deformed by the insertion of said bearing into said opening thereby exerting uneven pressure on the periphery of said mounted bearing after being deformed beyond its elastic limit upon insertion of a bearing therein.

2. A bearing mount and bearing as defined by claim 1 wherein said one end of said seat is integral with said flange portion.

3. A bearing mount and bearing as defined in claims 1 or 2 wherein said bearing seat has a generally spherical shaped inner surface for receiving a bearing.

4. A bearing mount and bearing as defined by claim 3 wherein said flange portion further includes at least one side plate extending generally parallel with said bearing seat, said side plate defining a second mounting surface substantially parallel to the axis of said mounting seat.

5. A bearing mount and bearing by claim 4 and further including at least one additional side plate spaced from said first side plate and generally parallel to the axis of said bearing seat, said additional side plate defining a third mounting surface.

6. In a bearing mount having a flange portion and a bearing receiving seat extending outwardly from said flange portion with one end of said seat being uniformly supported by said flange portion and the opposite end of said seat being unsupported, the method of assemblying a bearing in said mount comprising the steps of orienting said bearing with the bearing axis of rotation being essentially perpendicular to the axis of said seat, forcing said bearing into the center of said seat and thereby deforming said opposite end, and aligning the axis of rotation of said bearing in alignment with the axis of said seat, said opposite end being permanently deformed beyond its elastic limit whereby said opposite end contacts said bearing in uneven circumferential pressure engagement.

* * * * *

UNITED STATES PATENT AND TRADEMARK OFFICE
CERTIFICATE OF CORRECTION

PATENT NO. : 4,443,044
DATED : April 17, 1984
INVENTOR(S) : Earl S. Cain et al

It is certified that error appears in the above—identified patent and that said Letters Patent is hereby corrected as shown below:

Column 2, line 56 - "seal" should be --seat--

Column 2, line 65 - "rate" should be --race--

Column 3, line 36 - "25" should be --35--

Column 4, line 27 - "in" should be --by--

Column 4, line 35 - After "bearing" insert --as defined--

Signed and Sealed this

Second Day of October 1984

[SEAL]

Attest:

Attesting Officer

GERALD J. MOSSINGHOFF
Commissioner of Patents and Trademarks